United States Patent

[11] 3,622,165

[72] Inventor Seymour A. Hatch
     Oak Park, Ill.
[21] Appl. No. 819,042
[22] Filed Apr. 24, 1969
[45] Patented Nov. 23, 1971
[73] Assignee Chicago Rawhide Manufacturing Company
     Chicago, Ill.

[54] SEAL FOR TRACK PINS AND THE LIKE
     8 Claims, 4 Drawing Figs.
[52] U.S. Cl. ........................................ 277/95,
     277/42, 305/11
[51] Int. Cl. ................................................ F16j 15/38,
     B62d 55/08, B60s 1/62
[50] Field of Search ........................................ 277/92, 95,
     235, 231, 42; 305/11

[56] References Cited
     UNITED STATES PATENTS
     3,185,488  5/1965  Christensen et al. ......... 277/95 X
     3,241,844  3/1966  Morley ......................... 277/92
     3,437,385  4/1969  Deli .............................. 277/92 X
     2,560,557  7/1951  Curtis ........................... 277/42 UX
     2,687,909  8/1954  Blackman et al. ............ 277/231

Primary Examiner—Samuel B. Rothberg
Attorney—Greist, Lockwood, Greenawalt & Dewey ABSTRACT: A seal assembly for use in excluding mud, dirt and the like from an interior space defined by two relatively movable machine elements, comprising a resilient sealing ring having one outwardly facing mounting surface for reception in a machine bore, and a second axially directed end face sealing surface for engaging an oppositely directed, cooperating face of a machine element in a sealing relation. The mounting surface and the sealing surface are axially offset from each other and joined by an at least partially frustoconical body portion so that axially applied thrust tends to deform the seal ring, which is held against axial movement, either radially inwardly or outwardly. A relatively stiff support ring extends around an inner portion of the seal body to prevent inward radial deformation upon the application of the compressive radial loads, so that an end loading force creates a tight seal between the seal ring and the bore. Preferably, the seal body is formed with a recess or reentrant which permits removable reception of the ring therein prior to assembling the elements to apply the axially directed load between an end sealing face on the seal body and a corresponding face on one machine element.

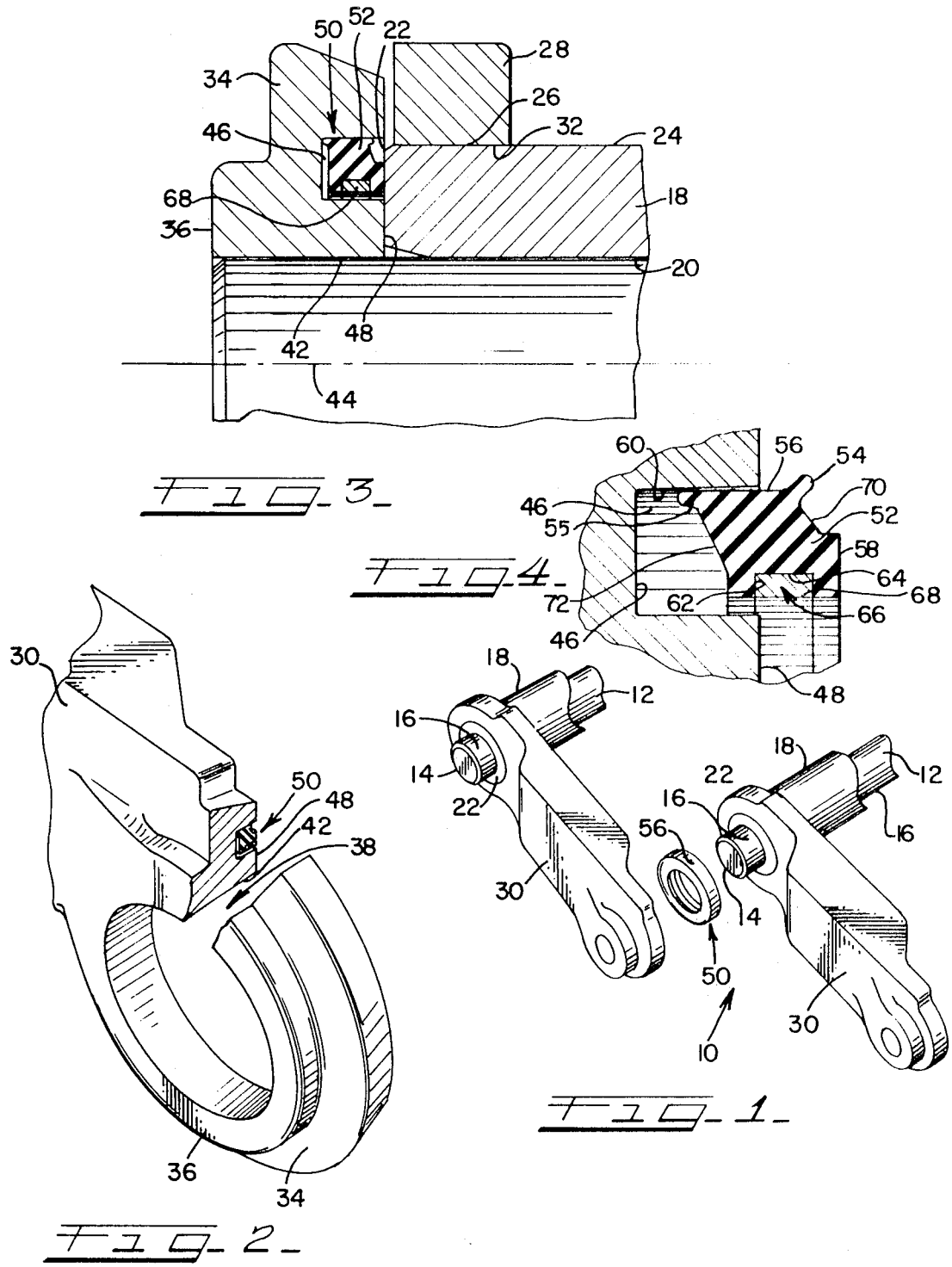
PATENTED NOV 23 1971  3,622,165
INVENTOR
SEYMOUR A. HATCH
ATT'YS.

SEAL FOR TRACK PINS AND THE LIKE

BACKGROUND OF THE INVENTION

The present invention relates generally to seal units, and also to combination machine assemblies which include such seal units, and is particularly directed to so-called end face seals for use with machine elements having two relatively movable parts which undergo rotary or oscillatory motion with respect to each other. Seals of the type with which the present invention is concerned are intended to exclude dirt, sand, mud, and the like from the machine assembly, and to retain a supply of lubricant inside a desired portion of such machine assembly. In particular, a seal of the type with which the present invention is concerned is retained within a portion of one machine member and held against movement therein, while presenting a sealing end face for sliding, sealing engagement with a corresponding end face of a second machine member which undergoes relative motion while the two sealing faces thus presented are in engagement with each other.

The seal of the present invention is particularly useful in sealing track pin assemblies, a plurality of which make up a crawler track assembly or crawler chain used to propel a crawler-type tractor or other track-laying vehicle, and are also adapted to be used with the track rollers which support a crawler track assembly comprised of a series of pins, links, plates, and the like.

A seal of the type with which this invention is concerned is called upon to resist abrasion from sand, grit, and the like, and to permit relative motion between a pair of machine elements while maintaining an axially directed load or force on one of the elements to maintain the seal, even during a certain amount of operational misalignment thereof, so that the sealing effectiveness of the unit may be maintained even when misalignment of track links or the like occurs in use.

Improved materials used in the seal manufacturing industry have now made possible the production of seal units which have a life expectancy which is substantially the same as or greater than that of the other machine components desired to be sealed, that is, in normal, use seals may be expected to last the lifetime of their associated components, such as track pins or track rollers, so that the seals need normally not be replaced while the other components are still in useable condition. However, several known seals for crawler assemblies having a lifetime capability are somewhat difficult to install, or have been characterized by metal-to-metal sealing surfaces which require extremely precise finishing, honing or lapping operations, or have had other at least partially undesirable characteristics. Other known seals have been characterized by metal-to-metal contact between the seal flange and the machine member in which they are received, and operate on the principle of torsional deflection in use. These seals often require exact machining of the members in which the metal portions are received. Furthermore, a torsional deflection-type seal is obviously not appropriate for use where the relative motion is rotary rather than oscillatory.

Therefore, an ideal track pin or like seal is one which, in addition to having a long life expectancy, is characterized in that it is easy to manipulate during installation, is of simple design, provides the requisite stiffness against inward radial deflection, provides means for receiving varying axial forces on the sealing face portion of the seal, provides reasonable flexibility, and presents a sealing face having the capability of mating with an opposed element to form a proper seal there between.

Accordingly, an object of the invention is to provide a track pin like seal which is simple to manufacture and easy to install.

Another object is to provide a seal unit which has means therein for facilitating reception and retention in a machine element in a free state, before the seal is compressed to its operating axial dimension in position of use.

Another object is to provide a seal unit having a resilient seal body and a resilient end sealing face portion which affords the primary seal between two movable machine elements.

A still further objects is to provide a seal unit including a resilient seal body to which radial stiffness is imparted by insertion of a relatively rigid support member, which serves to support the seal against compressive radial loads and direct a portion of the forces generated by such loads along a desired axis.

A further object is to provide a seal having improved force-versus-deflection characteristics, namely, a seal having a design such that strain on the elastomeric body member is primarily in shear rather than in direct compression, thereby permitting greater latitude in material selection and permitting improved sealing performance even when relatively stiff elastomers are used as the primary sealing element.

A still further object is to provide a seal unit which is easy to manufacture, which is composed of only two simple components, and which includes a homogeneous elastomeric body which may be completely manufactured before receiving the simple support ring with which it will be associated in use.

Another object is to provide an end face seal including a resilient body portion and means for receiving a stiffener or body supporting element therein, and in which the sealing face is axially offset from a surface which serves to mount the seal unit in place within a machine element.

Still another object is to provide a seal unit which comprises a body having a circumferential mounting surface portion, an axially directed end face sealing portion, a generally frustoconical cross section, and a seal body supporting element in an inner portion of the body to provide support therefor.

Another object is to provide a machine assembly which includes a seal unit having the foregoing as well as other objects and advantages.

The present invention achieves its objects, and other objects and advantages inherent therein, by providing a resilient rubber sealing body with an outer, circumferentially extending mounting surface portion, an axially directed end face sealing portion, an offsetting body portion extending between and joining said portions together, and means in said body for receiving a seal body supporting element therein. The exact manner in which this invention achieves these objects and advantages will become more apparent when the invention is considered in conjunction with the following detailed description of a preferred embodiment thereof, which is shown in the accompanying drawings, wherein like reference, numerals indicate corresponding parts throughout.

BRIEF DESCRIPTION OF THE DRAWINGS

FIG. 1 is a exploded perspective view showing a portion of a track pin assembly which includes the seal of the the present invention;

FIG. 2 is a enlarged perspective view, with portions broken away, of a portion of a track link, showing a vertical section through a portion of the seal of the invention in position of use thereof;

FIG. 3 is a further enlarged partial vertical sectional view of the seal of the invention in relation to other elements of the track pin and seal assembly;

FIG. 4 is a still further enlarged vertical sectional view of a portion of the seal body of the invention

DESCRIPTION OF THE PREFERRED EMBODIMENTS OF THE INVENTION

Referring now to the drawings in greater detail, FIG. 1 shows portions of a track pin and seal assembly 10, including two track pins 12, each having an end face 14, a cylindrical outer surface 16, and bushings 18 received thereover. FIG. 3 shows that each bushing 18 includes a circumferentially extending radially inner surface portion 20, an end portion 26 on which is slidingly received the end portion 28 of a track link 30, which includes an opening defined by an inner surface 32 therein. The line 30 is press fitted over the end portion 26 of the bushing 18.

Each link 30, in addition to the end portion 28 and the inner surface 32, includes an opposite end portion 34, shown with a raised outer surface portion 36, and has an opening 38 defined by a circumferentially extending inwardly facing surface 42, into which is press fitted, in a nonrotatable relation, the outer end portion 44 of the track pin 12. In use, the bushing 18 is separated by a diametral working clearance, such as from about 0.005 to about 0.030 inches from the track pin 12, while one end 28 of the link 30 is pressed over the bushing 18, and the other end 34 of the link 30 is press fitted over an end portion 34 of a link 30.

The end portion 34 of the link 30 also includes an annular groove 46, as best seen in FIGS. 3 and 4, and an adjacent inwardly facing end surface 48, which abuts the end sealing face 22 of the bushing 18. The seal assembly 50 of the invention is received within the inwardly facing, circumferentially extending surface 60 of the groove 46 in a manner which will now be described.

The seal unit 50 includes a generally frustoconical body portion 52, with an increased diameter mounting ring or "barb" 54 disposed on one axial end of a circumferentially extending, radially outwardly facing seal body mounting surface portion 56. An axial spacer unit or spacer "bump" 55 is disposed along a portion of the surface 56 in a generally opposite relation to the barb 54, for reasons which are further set forth herein. The seal body 52 also includes an axial end face sealing portion 58, and a circumferentially extending, radially inwardly facing seal support receiving means 66, which is concentrically disposed with relation to the mounting surface 56. This means 66 includes wall portions 62, 64 defining a generally rectangular reentrant in the body 54 for reception of seal body supporting means in the form of a separate, removable metal support ring 68, for adding stiffness against compressive radial load to the seal body 52.

A tapered or inclined surface 70 extends between the barb 54 adjacent the outer surface 56 and the end face seal portion 58 of the body, partially defining the frustoconical shape thereof. A similarly tapered surface 72 extends inwardly from the spacer bump 55 generally parallel to the surface 70, and define an axial face of the body 52. The body 52 defined by the surfaces 56, 70, 72 is therefore generally frustoconical in cross section in the free or uncompressed state thereof.

In preferred embodiment, the seal body 52 is made of an abrasive-resistant, moderately stiff rubber, such as nitrile rubber, and the ring 68 is of metal or other material which is relatively stiff in relation to the body 52 of the seal unit 50. The track links 30 as the track pins 12 and the bushings 18 are normally made of a steel material.

When it is desired to install the seal unit of the invention within a track assembly, a bushing 18 is fitted over a track 12, and a link 30 is fitted over the bushing 18, with the end portion 28 of the link 30 press fit tightly over the end portion 26 of the bushing 18. Another oppositely facing or mirror image link (not shown) is also fitted on the other end of the bushing 18 which is in place over the track pin 12. Preferably, the pin 12 is lubricated prior to this partial assembly. Thereafter another link 30 is selected, and the seal body 52, with the support ring 68 in place therein, is placed in the groove 46 and retained in place therein in a relatively unstressed condition, with the barb 54 engaging the inner surface 60 of the groove 46 to hold the body 52 in place. With the seal body 52 in a relatively unstressed condition, the outer diameter of the mounting surface 56 is ordinarily somewhat smaller than the outer diameter of the groove 46, but the barb 54 is of a slightly greater diameter than the groove 46; therefore, the barb 54 serves to hold the seal body 52 in place during assembly. Thereafter, the grease is applied to appropriate surfaces to lubricate the sliding face 58 of the seal 50 and the bearing surfaces of the track link joint.

Next, the end portion 34 of the link 30 is placed over the end portion 44 of the track pin 12, with the inner surface 42 of the end portion 34 engaging the pin 12 with a tight press fit. The end portion 34 is moved axially over the pin 12 so as to bring the face portion 48 of the link end 34 into an abutting or nearly abutting position in relation to the end face 22 of the bushing 18. As assembly is made in this manner, the seal body 52, including the end sealing face portion 58, is compressed axially, such as to the position shown in FIG. 3, and a portion of this axial compressive force causes radial outward expansion of the mounting surface 56 of the seal body 52, deflecting the barb 54 into the downward position, in the plane of the surfaces 56, as shown in FIG. 3. Thus, because of the frustoconical shape of the body 52, a force applied axially in compression to the face 58 tends to enlarge the outer diameter of the seal body 52. The mounting surface 60 acts as a restraint to place the entire seal unit under a desired compressive force, and the compressive radial load developed in opposition to this force cannot be dissipated inwardly because of the presence of the ring 66. Nevertheless, because of the frustoconical shape of the seal assembly 50, the sealing surface 58 of the seal body 52 may deflect much more per unit of applied force than would be the case if the body were stressed only in compression when an axial load is applied thereto. In other words, the strain on the body 52 is primarily in shear rather than in direct compression, Thus, a stiffer rubber may be used for purposes of improved longevity, without sacrificing the flexibility which is preferred to avoid criticality in axial dimensional tolerances. The provisions of the spacer bump 55 provides a means of spacing the seal assembly 50 apart from an end wall of the groove 46, and prevents "bottoming" of the seal 50 in the groove 46 under normal loads.

With the seal assembled in this manner, a rubber-to-metal seal is developed which is extremely effective in excluding dirt from the assembly and in retaining lubricant therein for an indefinite time. Because the primary seal surface at the interface of the surfaces 58, 22 is a rubber-to-metal seal track pin, misalignment which occurs in use of the tracks under extremely heavy loads can be easily accommodated, although alignment is, within limits, maintained by the engagement of the face 22 with the oppositely disposed surface 48. A secondary seal exists between the surfaces 56 and 60, but since the axial load tends to maintain this seal in a tight condition, no relative movement takes place at this interface.

In a preferred embodiment, the materials referred to above give excellent results, however, other suitable materials having the desired characteristics of resilience and stiffness respectively, may be substituted for the materials illustrated herein.

A seal made as described is relatively easy to manufacture since it is composed of only two simple components. The elastomeric body can be homogeneous and its manufacture can be completed before the simple support ring is snapped into place.

A seal made as described above may be installed easily and does not call for special skills, unusual tools or the like. In use, such a seal will last several million oscillating or rotating cycles, and will normally have a life expectancy which is longer than that of the other components with which it is associated, such as portions of a track assembly.

It will thus be seen that the present invention provides a new and useful seal assembly and combination thereof with a crawler track assembly, both having a number of advantages and characteristics, including those pointed out herein and others which are inherent in the invention.

I claim:

1. A seal unit for excluding foreign matter from the interior of an assembly which includes first and second members which are movable relative to each other, at least one of said members having an axially facing, radially extending sealing surface, said seal unit comprising, in combination, a seal body formed entirely of an otherwise unsupported elastomeric material to permit forces applied axially to one portion of said body to be transformed to forces causing radial compressive load and radial dimensional change and having a generally annular configuration and including an axial end face sealing portion disposed in a given plane and having a given radial extent, a radially outer, generally circumferentially extending outwardly facing mounting surface portion, a portion of said mounting surface portion being axially offset from said given plane, a generally frustoconical offsetting body portion extending between and joining said mounting surface portion and said end face sealing portion, a radially inner, circumferentially extending body portion disposed generally concentrically with said mounting surface portion, means in said inner portion of said body for receiving seal body supporting means, and seal body supporting means associated with said means for receiving said supporting means and supporting only said inner portion of said seal body. Said supporting means being relatively more rigid than said body, having a substantial axial extent in relation to the axial extent of said mounting surface portion, and being spaced axially apart from said end face sealing portion of said seal body.

2. A seal unit as defined in claim 1 in which said seal body supporting means is a metal ring.

3. A seal unit as defined in claim 1 in which said means for receiving said seal body supporting means comprises a reentrant of rectangular cross section, having a substantial portion thereof disposed radially inwardly of said mounting surface portion.

4. A seal unit as defined in claim 1 wherein said seal includes a slightly angled, generally axially facing end portion disposed oppositely from said end face sealing portion and having a substantial radial extent, said portion terminating at its outer edge in an axial spacer for offsetting the remainder of said end portion from means for receiving said body.

5. A seal unit as defined in claim 1, which further includes a mounting barb for holding said seal unit in place in the absence of compressive radial load forces, said barb extending radially outwardly from the plane of said mounting surface portion for engaging an associated mounting surface on a machine element, said barb being movable to a position in which a portion of the outer surface thereof lies in the plane of said mounting surface.

6. A seal unit as defined in claim 1 in which said offsetting body portion, said end face sealing portion and said mounting surface portion are arranged so that radially inwardly directed forces applied to the circumference of said mounting surface portion tend to be transmitted to said end face sealing portion to urge said portion into a tighter sealing relation with an oppositely directed face with which it is associated in use, and forces applied axially against said end face sealing portion are directed at least partially radially outwardly toward said mounting surface portion of said unit.

7. A seal unit as defined in claim 2, in which said metal ring is removably held in place, in use, within said seal body.

8. In combination, a seal unit as defined in claim 1, a first machine element including an axial end sealing face portion, and a second machine element associated with said first element and being mounted for movement relative thereto, said second element having a circumferentially extending, radially inwardly facing mounting surface portion thereon, said mounting surface of said seal unit being engaged by said mounting surface portion of said second element, and said end sealing face portion of said seal unit engaging said end sealing face portion of said first machine element.

* * * * *

UNITED STATES PATENT OFFICE
CERTIFICATE OF CORRECTION

Patent No. 3,622,165　　　　　　　　　　Dated November 23, 1971

Inventor(s) Seymour A. Hatch

It is certified that error appears in the above-identified patent and that said Letters Patent are hereby corrected as shown below:

Column 1, line 41, the third "," should be between "use" and "seals" instead of after "normal".

Column 2, line 1, "objects" should be --object--.

Column 2, line 74, "line" should be --link--.

Column 3, line 48, insert --as well-- between "30" and "as".

Column 4, line 8, the second "the" should be --a--.

Column 4, line 26, "provisions" should be --provision--.

Signed and sealed this 12th day of September 1972.

(SEAL)
Attest:

EDWARD M. FLETCHER, JR.　　　　　　ROBERT GOTTSCHALK
Attesting Officer　　　　　　　　　　Commissioner of Patents